US012735111B2

(12) United States Patent
Yamagishi et al.

(10) Patent No.: US 12,735,111 B2
(45) Date of Patent: Sep. 15, 2026

(54) CAR PANEL STRUCTURE

(71) Applicant: Honda Motor Co., Ltd., Tokyo (JP)

(72) Inventors: Kenta Yamagishi, Tokyo (JP); Takeki Junibayashi, Tokyo (JP); Futoshi Matsuda, Tokyo (JP); Yota Eguchi, Tokyo (JP); Mitsuhiro Kanafuki, Tokyo (JP); Akihisa Matsuda, Tokyo (JP); Arisa Kanazawa, Tokyo (JP); Hiroshi Kobori, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 303 days.

(21) Appl. No.: 18/583,762

(22) Filed: Feb. 21, 2024

(65) Prior Publication Data

US 2024/0317316 A1 Sep. 26, 2024

(30) Foreign Application Priority Data

Mar. 20, 2023 (CN) ......................... 202310271606.8

(51) Int. Cl.
*B62D 25/00* (2006.01)
*B62D 27/02* (2006.01)
*B62D 25/10* (2006.01)

(52) U.S. Cl.
CPC ........... *B62D 25/00* (2013.01); *B62D 27/026* (2013.01); *B62D 25/10* (2013.01)

(58) Field of Classification Search
CPC ........ B62D 25/00; B62D 25/10; B62D 25/12; B62D 27/026
USPC ............................................ 296/191, 193.11
See application file for complete search history.

(56) References Cited

U.S. PATENT DOCUMENTS

| | | | | |
|---|---|---|---|---|
| 5,124,191 | A * | 6/1992 | Seksaria | B32B 15/08 52/789.1 |
| 7,140,673 | B2 * | 11/2006 | Ito | B60R 21/34 296/193.11 |
| 7,488,031 | B2 * | 2/2009 | Ishitobi | B62D 25/105 296/193.11 |
| 9,033,407 | B2 * | 5/2015 | Ikeda | B60R 21/34 296/193.11 |
| 2005/0082874 | A1 * | 4/2005 | Ikeda | B60R 21/34 296/193.11 |
| 2006/0144014 | A1 * | 7/2006 | Yoon | B29C 66/322 52/784.1 |

FOREIGN PATENT DOCUMENTS

JP 2005125989 5/2005

* cited by examiner

*Primary Examiner* — Roger L Pang
(74) *Attorney, Agent, or Firm* — JCIPRNET

(57) ABSTRACT

A car panel structure, which can prevent a binder in a recess on an inner panel from overflowing during a processing process after the inner panel and an outer panel are bonded to each other, is provided. The car panel structure includes the outer panel forming an exterior of the car panel structure; and the inner panel fixed on an interior of the outer panel through the binder, wherein the inner panel has the recess recessed along a direction away from the outer panel, the recess has a binder coating portion, and the binder coating portion is vertically offset relative to a bottom surface of the recess.

5 Claims, 10 Drawing Sheets

CAR PANEL STRUCTURE

CROSS-REFERENCE TO RELATED APPLICATION

This application claims the priority benefit of China application serial no. 202310271606.8, filed on Mar. 20, 2023. The entirety of the above-mentioned patent application is hereby incorporated by reference herein and made a part of this specification.

BACKGROUND

Technical Field

The disclosure relates to a panel structure, and in particular to a car panel structure.

Description of Related Art

In a car panel structure, a recess on an inner panel has a binder coating portion for accommodating a binder, and the inner panel is bonded to an outer panel through the binder. After the inner panel and the outer panel are bonded to each other, when a subsequent impregnating procedure such as electrodeposition coating is performed to apply stress to each panel, the binder in the recess is prone to overflowing. Therefore, the car panel structure needs to be improved to overcome the issue.

SUMMARY

The disclosure provides a car panel structure, which includes an outer panel forming an exterior of the car panel structure; and an inner panel fixed on an interior of the outer panel through a binder. The inner panel has a recess recessed along a direction away from the outer panel. The recess has a binder coating portion. The binder coating portion is vertically offset relative to a bottom surface of the recess.

DESCRIPTION OF THE EMBODIMENTS

The disclosure provides a car panel structure, which can prevent a binder in a recess on an inner panel from overflowing during a processing process after the inner panel and an outer panel are bonded to each other.

The disclosure provides a car panel structure, which includes an outer panel forming an exterior of the car panel structure; and an inner panel fixed on an interior of the outer panel through a binder. The inner panel has a recess recessed along a direction away from the outer panel. The recess has a binder coating portion. The binder coating portion is vertically offset relative to a bottom surface of the recess.

In an embodiment of the disclosure, the binder coating portion has a concave portion. The concave portion is recessed in the recess along a direction away from the outer panel.

In an embodiment of the disclosure, the concave portion is hemispherical.

In an embodiment of the disclosure, the binder coating portion has a convex portion. The convex portion protrudes from the recess along a direction close to the outer panel.

In an embodiment of the disclosure, the convex portion is hemispherical.

Based on the above, in the car panel structure of the disclosure, in the case where the binder coating portion is vertically offset downward relative to the bottom surface of the recess to form the concave portion, the recess has a greater space for accommodating the binder due to the presence of the concave portion, so the overflow of the binder can be suppressed, and a greater amount of the binder may be applied to increase the bonding strength. On the other hand, in the case where the binder coating portion is vertically offset upward relative to the bottom surface of the recess to form the convex portion, the convex portion in the recess can increase the rigidity of the bottom surface of the recess to support the outer panel, so the size of the recess can be appropriately increased while still having sufficient support strength. The recess with the increased size has a greater space for accommodating the binder, so the overflow of the binder can be suppressed. Therefore, the car panel structure of the disclosure can prevent the binder in the recess on the inner panel from overflowing during a processing process after the inner panel and the outer panel are bonded to each other.

Figure 1:
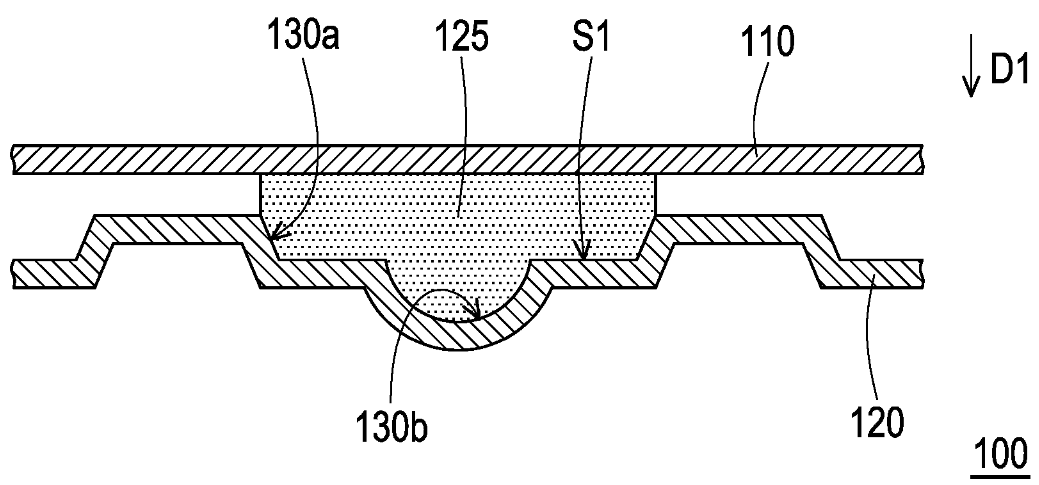
FIG. 1 is a partial cross-sectional schematic view of a car panel structure according to an embodiment of the disclosure.
Figure 2:
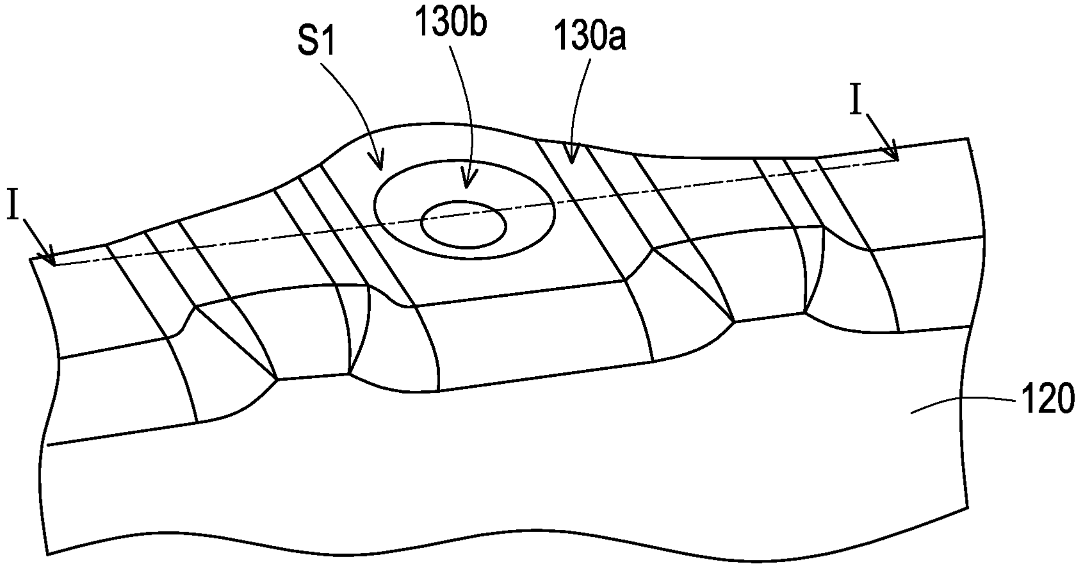
FIG. 2 is a three-dimensional view of an inner panel and a binder coating portion of FIG. 1.

FIG. 1 is a partial cross-sectional schematic view of a car panel structure according to an embodiment of the disclosure. FIG. 2 is a three-dimensional view of an inner panel and a binder coating portion of FIG. 1. FIG. 1 corresponds to a line I-I of FIG. 2. Please refer to FIG. 1 and FIG. 2. A car panel structure 100 of the embodiment includes an outer panel 110 and an inner panel 120. The outer panel 110 forms an exterior of the car panel structure 100. The inner panel 120 is fixed on an interior of the outer panel 110 through a binder 125. The outer panel 110 is, for example, a hood skin, and the inner panel 120 is, for example, a hood frame, but the disclosure is not limited thereto.

Specifically, the inner panel 120 has a recess 130*a* recessed along a direction D1 away from the outer panel 110. The recess 130*a* has a binder coating portion 130*b* and is configured to accommodate the binder 125. The binder coating portion 130*b* of the embodiment is, for example, integrally formed and connected to the inner panel 120. In addition, the binder coating portion 130*b* is vertically offset downward relative to a bottom surface S1 of the recess 130*a* along the direction (that is, the direction D1) away from the outer panel 110 to form a concave portion. Under the configuration, the recess 130*a* has a greater space for accommodating the binder 125 due to the presence of the concave portion (the binder coating portion 130*b*). Therefore, during a processing process after the inner panel 120 and the outer panel 110 are bonded to each other, the binder 125 can be prevented from being compressed and overflowing due to the inner panel 120 and the outer panel 110 being forced close to each other, thereby preventing the binder 125 remaining in the recess 130*a* from being insufficient after the inner panel 120 and the outer panel 110 are reset, and a greater amount of the binder 125 may be applied to increase the bonding strength.

Figure 3A:
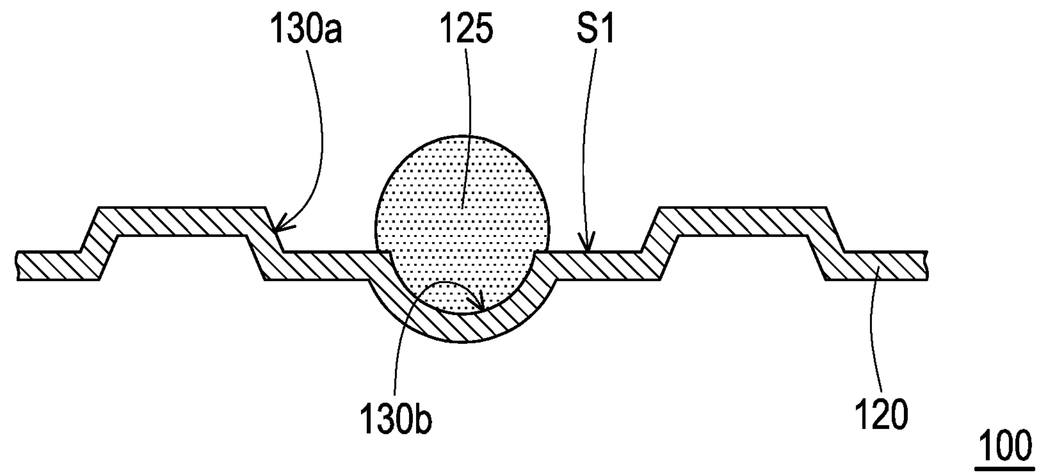
FIG. 3A to FIG. 3D illustrate a manufacturing process of the car panel structure of FIG. 1.
Figure 3B:
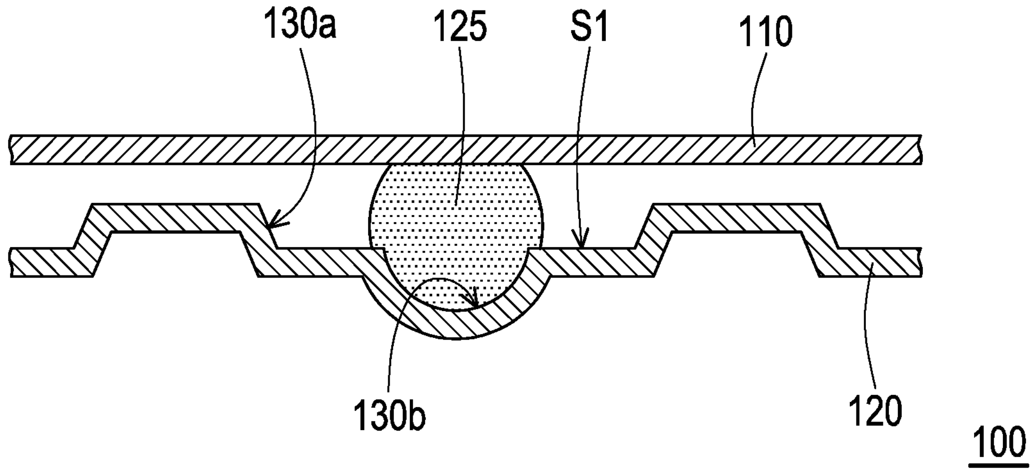
Figure 3C:
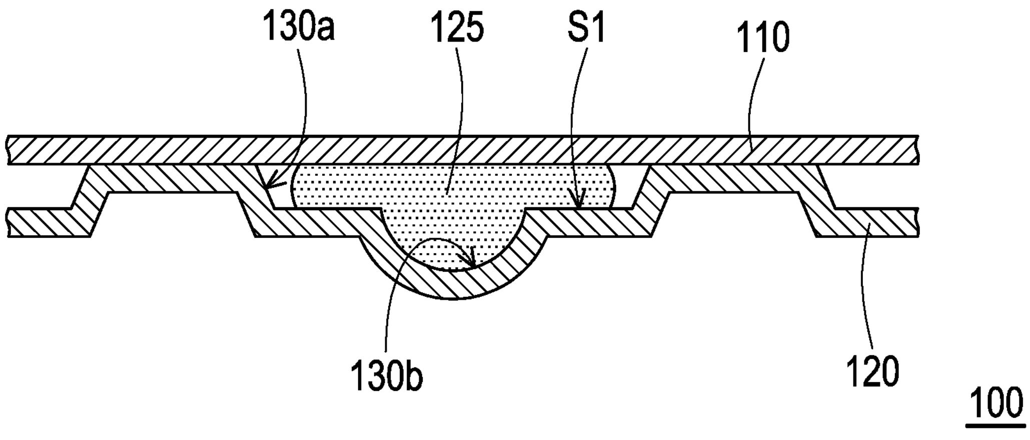
Figure 3D:
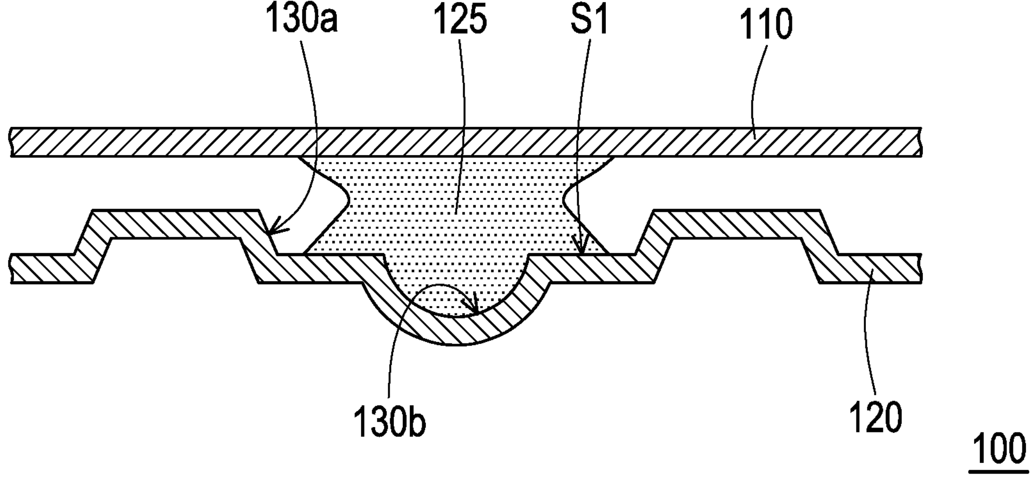

The distribution state of the binder 125 shown in FIG. 1 is only for illustration and will be described in more detail below with reference to the drawings. FIG. 3A to FIG. 3D illustrate a manufacturing process of the car panel structure of FIG. 1. Specifically, after the binder 125 is applied to the inner panel 120 as shown in FIG. 3A and the outer panel 110 and the inner panel 120 are joined through the binder 125 as shown in FIG. 3B, the inner panel 120 and the outer panel 110 may be forced close to each other due to subsequent processing, so that the binder 125 is compressed as shown in FIG. 3C. Since the recess 130*a* has a greater space for accommodating the binder 125 due to the presence of the concave portion (the binder coating portion 130*b*) as mentioned above, the binder 125 does not overflow outside the recess 130*a* even in the state shown in FIG. 3C. Therefore, in the state where the inner panel 120 and the outer panel 110 are reset as shown in FIG. 3D, there is still sufficient binder 125 in the recess 130*a*, and the binder 125 having excessive gaps will not be formed due to insufficient binder 125 remaining in the recess 130*a*.

In the embodiment, the concave portion (the binder coating portion 130*b*) is, for example, hemispherical rather than stepped. Accordingly, the force acting on the concave portion (the binder coating portion 130*b*) can be dispersed without easily causing structural deformation, and cracks are less likely to occur during press forming. In other embodiments, the concave portion (the binder coating portion 130*b*) may have other appropriate shapes, which is not limited by the disclosure.

Figure 4:
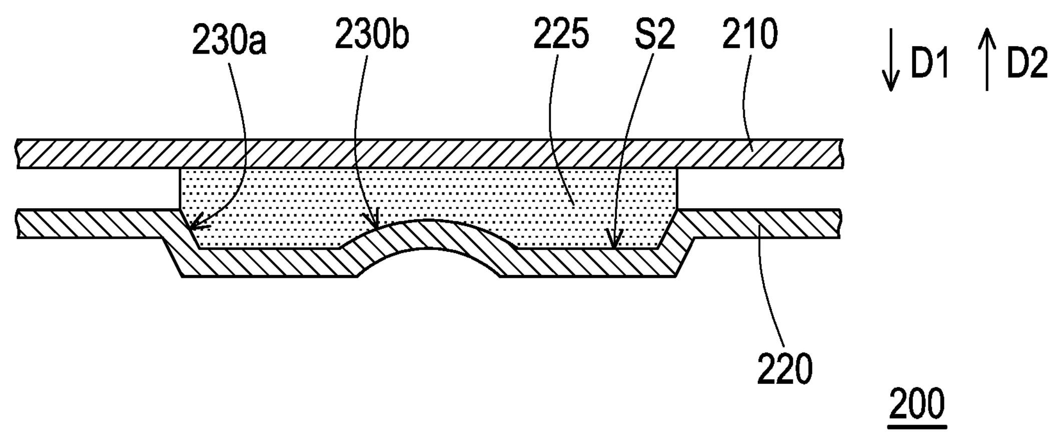
FIG. 4 is a partial cross-sectional schematic view of a car panel structure according to another embodiment of the disclosure.
Figure 5:
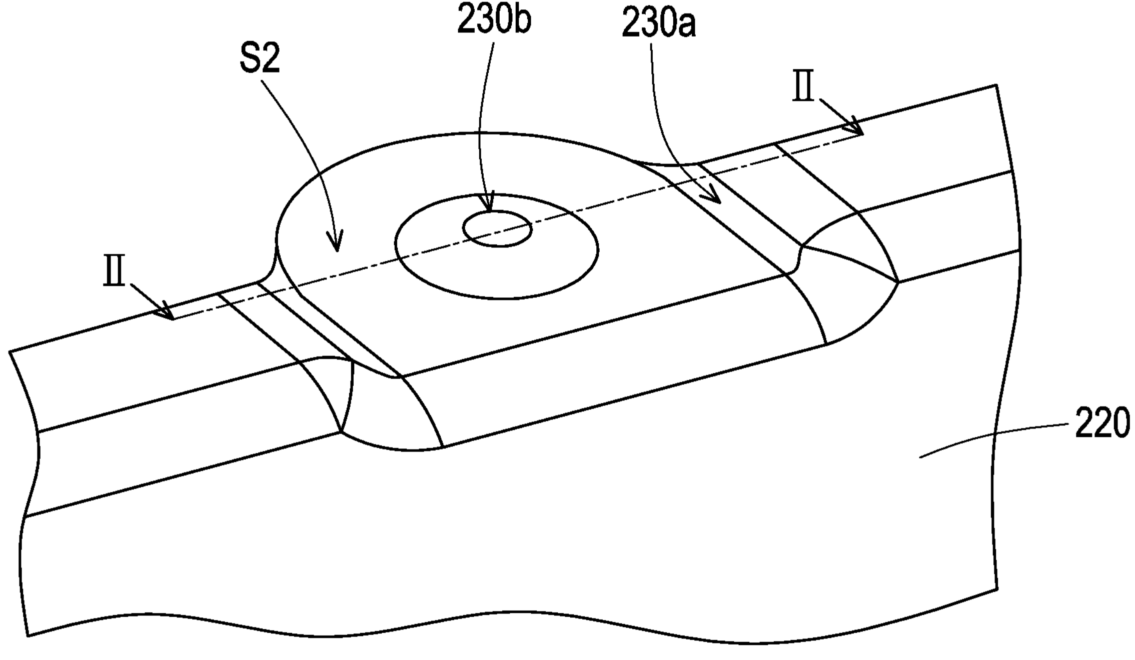
FIG. 5 is a three-dimensional view of an inner panel and a binder coating portion of FIG. 4.

FIG. 4 is a partial cross-sectional schematic view of a car panel structure according to another embodiment of the disclosure. FIG. 5 is a three-dimensional view of an inner panel and a binder coating portion of FIG. 4. FIG. 4 corresponds to a line II-II of FIG. 5. Please refer to FIG. 4 and FIG. 5. A car panel structure 200 of the embodiment includes an outer panel 210 and an inner panel 220. The outer panel 210 forms an exterior of the car panel structure 200. The inner panel 220 is fixed on an interior of the outer panel 210 through a binder 225. The outer panel 210 is, for example, a hood skin, and the inner panel 220 is, for example, a hood frame, but the disclosure is not limited thereto.

Specifically, the inner panel 220 has a recess 230*a* recessed along a direction D1 away from the outer panel 210. The recess 230*a* has a binder coating portion 230*b* and is configured to accommodate the binder 225. The binder coating portion 230*b* of the embodiment is, for example, integrally formed and connected to the inner panel 220. In addition, the binder coating portion 230*b* is vertically offset upward relative to a bottom surface S2 of the recess 230*a* along a direction (that is, a direction D2) close to the outer panel 210 to form a convex portion. Under the configuration, the convex portion (the binder coating portion 230*b*) in the recess 230*a* can increase the rigidity of the bottom surface S2 of the recess 230*a* to support the outer panel 210, so the size of the recess 230*a* can be appropriately increased while still having sufficient support. The recess 230*a* with the increased size has a greater space for accommodating the binder 225. Therefore, during a processing process after the inner panel 220 and the outer panel 210 are bonded to each other, the binder 225 can be prevented from being compressed and overflowing due to the inner panel 220 and the outer panel 210 being forced close to each other, thereby preventing the binder 225 remaining in the recess 230*a* from being insufficient after the inner panel 220 and the outer panel 210 are reset, and a greater amount of the binder 225 may be applied to increase the bonding strength.

Figure 6A:
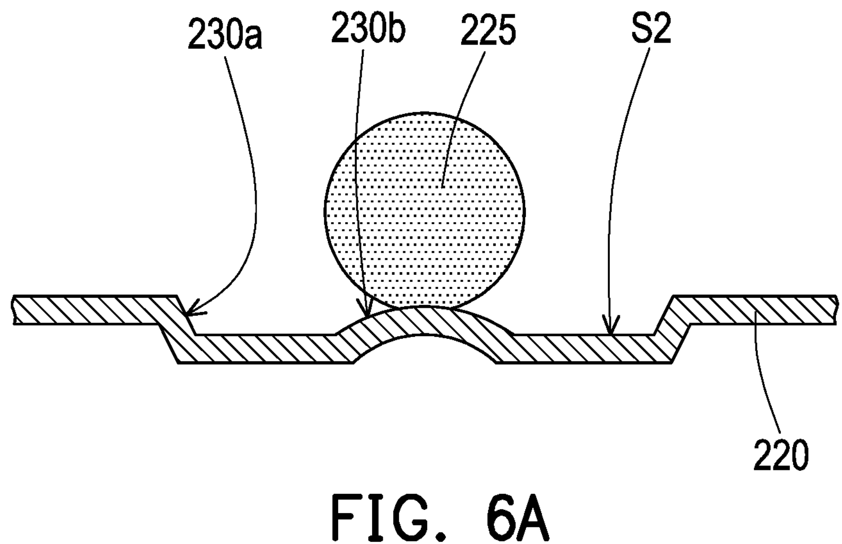
FIG. 6A to FIG. 6D illustrate a manufacturing process of the car panel structure of FIG. 4.
Figure 6B:
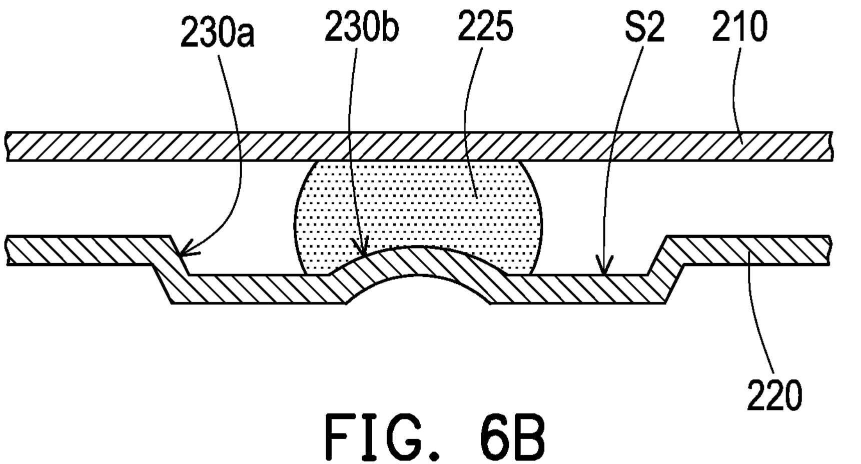
Figure 6C:
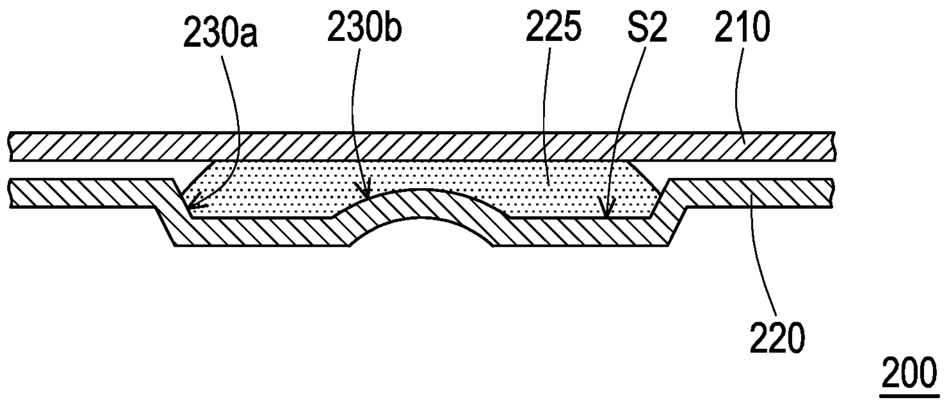
Figure 6D:
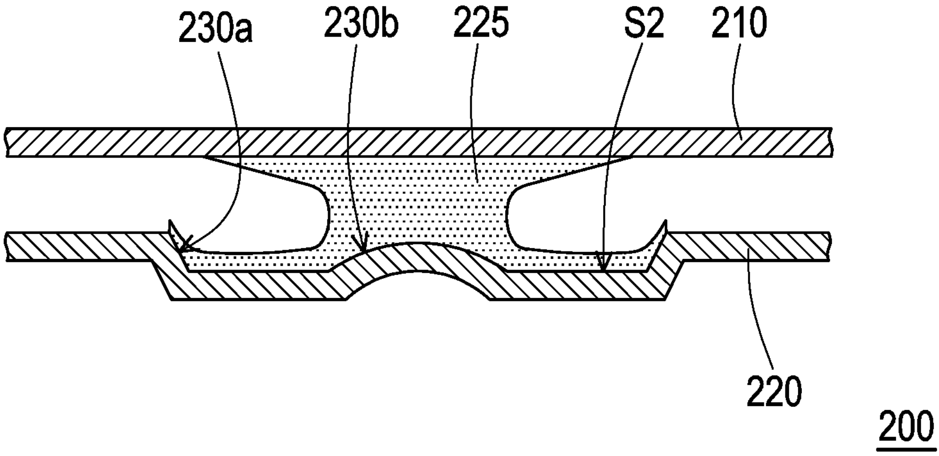

The distribution state of the binder 225 shown in FIG. 4 is only for illustration and will be described in more detail below with reference to the drawings. FIG. 6A to FIG. 6D illustrate a manufacturing process of the car panel structure of FIG. 4. Specifically, after the binder 225 is applied to the inner panel 220 as shown in FIG. 6A and the outer panel 210 and the inner panel 220 are joined through the binder 225 as shown in FIG. 6B, the inner panel 220 and the outer panel 210 may be forced close to each other due to subsequent processing, so that the binder 225 is compressed as shown in FIG. 6C. Since the recess 230*a* can be appropriately increased in size due to the presence of the convex portion (the binder coating portion 230*b*) as mentioned above to have a greater space for accommodating the binder 225, the binder 225 does not overflow outside the recess 230*a* even in the state shown in FIG. 6C. Therefore, in the state where the inner panel 220 and the outer panel 210 are reset as shown in FIG. 6D, there is still sufficient binder 225 in the recess 230*a*, and the binder 225 having excessive gaps will not be formed due to insufficient binder 225 remaining in the recess 230*a*.

In the embodiment, the convex portion (the binder coating portion 230*b*) is, for example, hemispherical rather than stepped. Accordingly, the force acting on the convex portion (the binder coating portion 230*b*) can be dispersed without easily causing structural deformation, and cracks are less likely to occur during press forming. In addition, the binder 225 can be uniformly diffused into the recess 230*a* along the spherical shape of the convex portion (the binder coating portion 230*b*). In other embodiments, the convex portion (the binder coating portion 230*b*) may have other appropriate shapes, which is not limited by the disclosure.

The disclosure does not limit the form of the car panel structure, which is illustrated below through the drawings.

Figure 7:
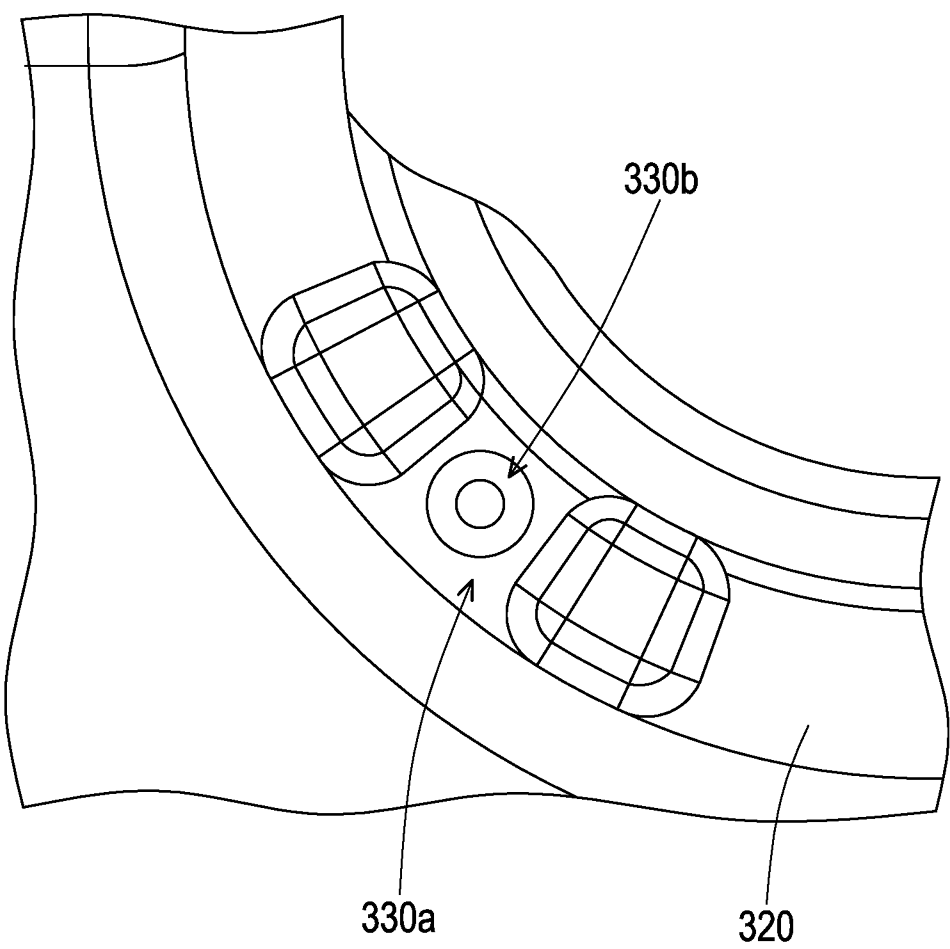
FIG. 7 is a top view of a part of an inner panel according to another embodiment of the disclosure.
Figure 8:
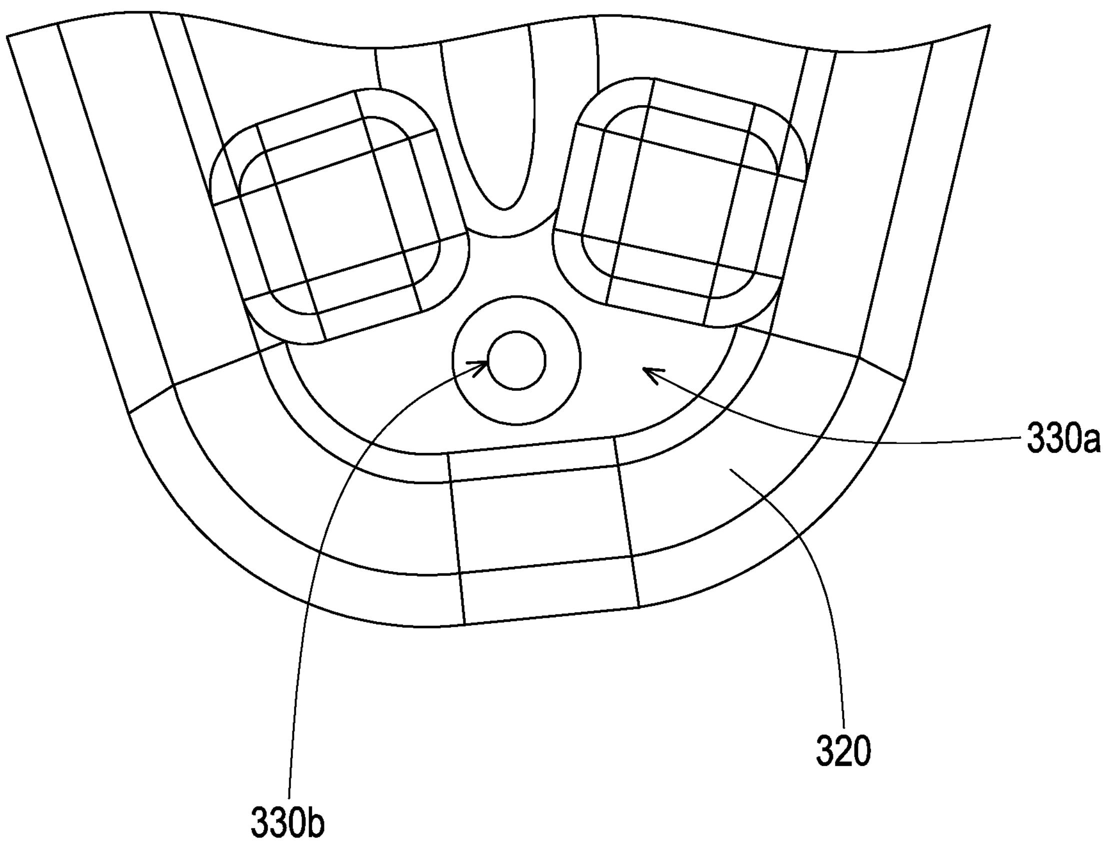
FIG. 8 is a top view of another part of the inner panel of FIG. 7.

FIG. 7 is a top view of a part of an inner panel according to another embodiment of the disclosure. FIG. 8 is a top view of another part of the inner panel of FIG. 7. The shapes of an inner panel 320 and a recess 330*a* thereof and a binder coating portion 330*b* of the embodiment shown in FIG. 7 and FIG. 8 are different from the shapes of the inner panel 120 and the recess 130*a* thereof and the binder coating portion 130*b* of the embodiment shown in FIG. 2. The recess 330*a* extends in a slightly curved shape along with the overall shape of the inner panel 320. The binder coating portion 330*b* is formed into a concave portion and has a function similar to the binder coating portion 130*b* of the embodiment shown in FIG. 2, which will not be described again.

Figure 9:
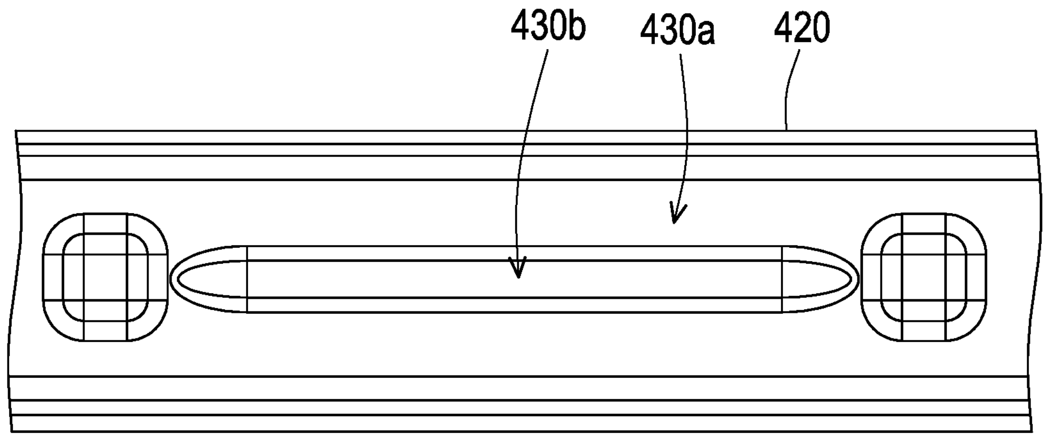
FIG. 9 is a top view of a part of an inner panel according to another embodiment of the disclosure.
Figure 10:
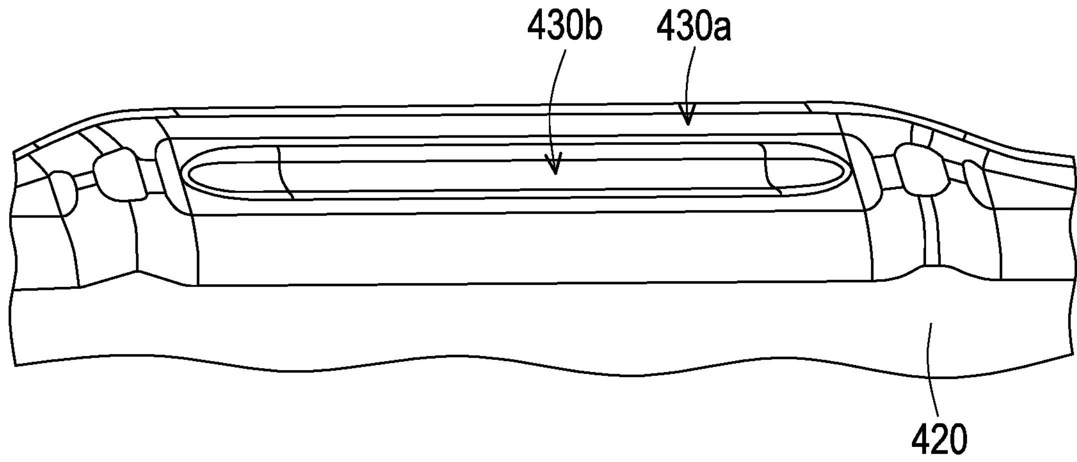
FIG. 10 is a three-dimensional view of another part of the inner panel of FIG. 9.

FIG. 9 is a top view of a part of an inner panel according to another embodiment of the disclosure FIG. 10 is a three-dimensional view of another part of the inner panel of FIG. 9. The shapes of an inner panel 420 and a recess 430*a* thereof and a binder coating portion 430*b* of the embodiment shown in FIG. 9 and FIG. 10 are different from the shapes of the inner panel 120 and the recess 130*a* thereof and the binder coating portion 130*b* of the embodiment shown in FIG. 2. The binder coating portion 430*b* is elongated and extends in an extension direction of the recess 430*a*. The binder coating portion 430*b* is formed into a concave portion and has a function similar to the binder coating portion 130*b* of the embodiment shown in FIG. 2, which will not be described again.

Figure 11:
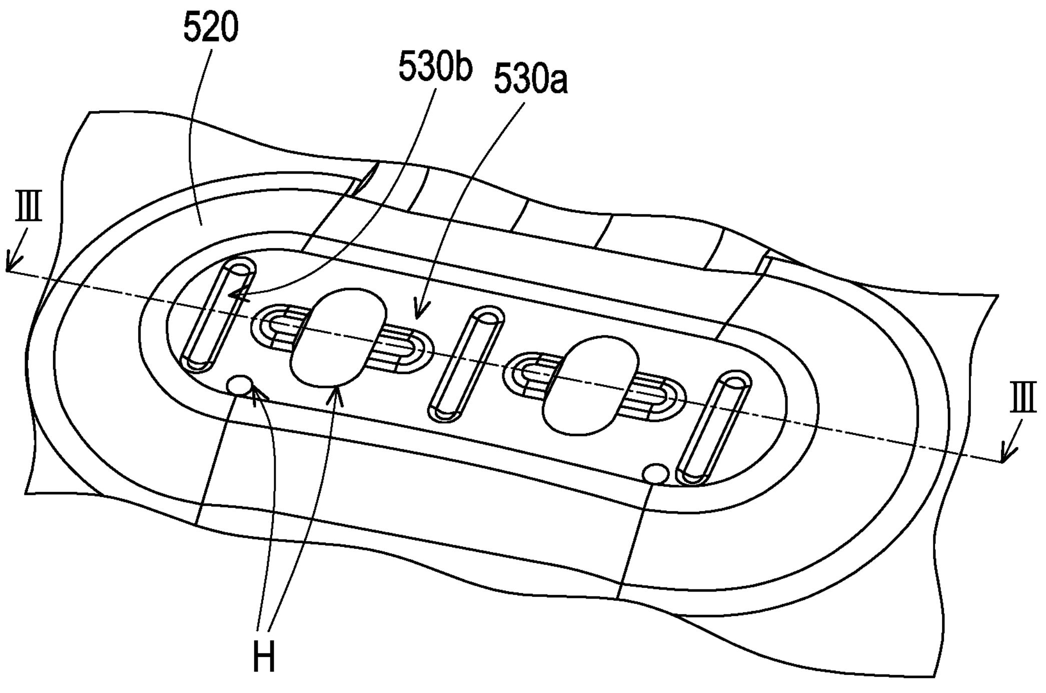
FIG. 11 is a three-dimensional view of an inner panel according to another embodiment of the disclosure.
Figure 12:
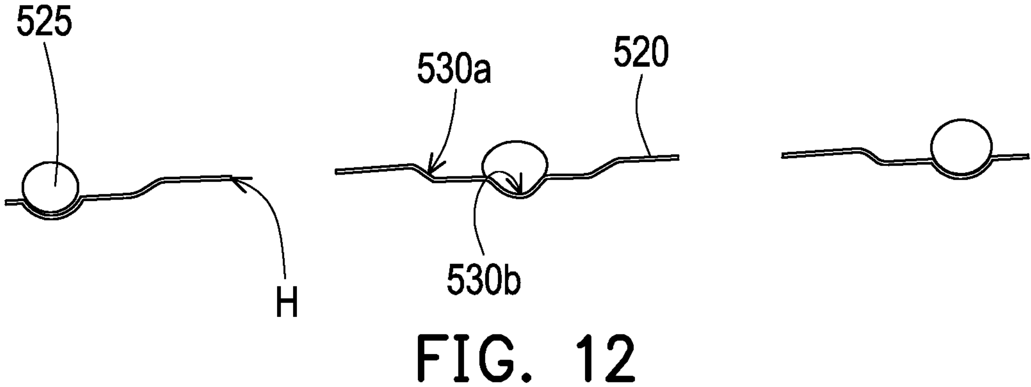
FIG. 12 is a cross-sectional view of the inner panel of FIG. 11 having a binder.

FIG. 11 is a three-dimensional view of an inner panel according to another embodiment of the disclosure. FIG. 12 is a cross-sectional view of the inner panel of FIG. 11 having a binder (a binder 525). FIG. 12 corresponds to a line III-III of FIG. 11. The shapes of an inner panel 520 and a recess 530*a* thereof and a binder coating portion 530*b* of the embodiment shown in FIG. 11 and FIG. 12 are different from the shapes of the inner panel 120 and the recess 130*a* thereof and the binder coating portion 130*b* of the embodiment shown in FIG. 2. The binder coating portion 530*b* is elongated and is formed in the recess 530*a* together with a drainage hole H. The binder coating portion 530*b* is formed into a concave portion and has a function similar to the binder coating portion 130*b* of the embodiment shown in FIG. 2, which will not be described again.

In summary, in the car panel structure of the disclosure, in the case where the binder coating portion is vertically offset downward relative to the bottom surface of the recess to form the concave portion, the recess has a greater space for accommodating the binder due to the presence of the concave portion, so the overflow of the binder can be suppressed, and a greater amount of the binder may be applied to increase the bonding strength. On the other hand, in the case where the binder coating portion is vertically offset upward relative to the bottom surface of the recess to form the convex portion, the convex portion in the recess can increase the rigidity of the bottom surface of the recess to support the outer panel, so the size of the recess can be appropriately increased while still having sufficient support strength. The recess with the increased size has a greater space for accommodating the binder, so the overflow of the binder can be suppressed. Therefore, the car panel structure of the disclosure can prevent the binder in the recess on the inner panel from overflowing during the processing process after the inner panel and the outer panel are bonded to each other.

Finally, it should be noted that the above embodiments are only configured to illustrate, but not to limit, the technical solutions of the disclosure. Although the disclosure has been described in detail with reference to the above embodiments, persons skilled in the art should understand that the technical solutions described in the above embodiments may still be modified or some or all of the technical features thereof may be equivalently replaced. However, the modifications or replacements do not cause the essence of the corresponding technical solutions to deviate from the scope of the technical solutions of the embodiments of the disclosure.

What is claimed is:

1. A car panel structure, comprising:

an outer panel, forming an exterior of the car panel structure;

a binder; and an inner panel, fixed on an interior of the outer panel through the binder, wherein the inner panel has a recess recessed along a direction away from the outer panel, the recess has a binder coating portion, and the binder coating portion is vertically offset relative to a bottom surface of the recess, wherein when the outer panel and the inner panel are in contact with each other at an outer side of the recess, the binder is located in a space formed by the bottom surface of the recess and the outer panel and the binder is in contact with the bottom surface of the recess.

2. The car panel structure according to claim 1, wherein:

the binder coating portion has a concave portion, and the concave portion is recessed in the recess along a direction away from the outer panel.

3. The car panel structure according to claim 2, wherein:

the concave portion is hemispherical.

4. The car panel structure according to claim 1, wherein:

the binder coating portion has a convex portion, and the convex portion protrudes from the recess along a direction close to the outer panel.

5. The car panel structure according to claim 4, wherein:

the convex portion is hemispherical.

* * * * *